United States Patent [19]

Fujiwara et al.

[11] Patent Number: 5,849,257
[45] Date of Patent: Dec. 15, 1998

[54] PROCESS FOR PREPARATION OF NITROUS OXIDE

[75] Inventors: Kenji Fujiwara, Kanagawa-ken; Hideaki Nakamura, Osaka-fu; Hiroshi Kato, Osaka-fu; Susumu Yoshinaga, Osaka-fu; Kazuo Wakimura, Osaka-fu, all of Japan

[73] Assignee: Mitsui Chemicals, Inc., Tokyo, Japan

[21] Appl. No.: 829,612

[22] Filed: Mar. 31, 1997

[30] Foreign Application Priority Data

Apr. 3, 1996 [JP] Japan .................................. 8-081327
Apr. 25, 1996 [JP] Japan .................................. 8-105124

[51] Int. Cl.$^6$ ............................................. C01B 21/26
[52] U.S. Cl. ........................... 423/404; 423/400; 423/403
[58] Field of Search .................................. 423/385, 400, 423/403, 404

[56] References Cited

FOREIGN PATENT DOCUMENTS

| | | |
|---|---|---|
| 36-10958 | 7/1961 | Japan . |
| 46-33210 | 9/1971 | Japan . |
| 54-20994 | 2/1979 | Japan . |
| 5-58607 | 3/1993 | Japan . |
| 5-139710 | 6/1993 | Japan . |
| 6-122505 | 5/1994 | Japan . |
| 6-122506 | 5/1994 | Japan . |
| 6-122507 | 5/1994 | Japan . |
| 6122507 | 5/1994 | Japan .................................. 423/403 |
| 30-1225 | 2/1995 | Japan . |

OTHER PUBLICATIONS

Shokubai Kagaku Koza 10, by Chijin Shokan, 410–413 (1967).
Y. Suwa et al, Kogyo Kagaku Zassi, 64, 1879–1888 (1961).
JACS 43 1982–1987 (1921).
Ann. Chim. Fr. (Paris), 3, 429–452 (1978).
Bull. Soc. Chim. Fr., 9–10, I–363–364 (1980).
J. Chim. Phys., Phys. Chim. Biol., 86, 1889–1915 (1989).
ICDD, Powder Diffraction File, Alphabetical Indexes Inorganic Phases Sets 1–45 (1995).

*Primary Examiner*—Michael L. Lewis
*Assistant Examiner*—Thomas G. Dunn, Jr.
*Attorney, Agent, or Firm*—Burns, Doane, Swecker & Mathis, L.L.P.

[57] ABSTRACT

A process for preparation of nitrous oxide, wherein ammonia is reacted with oxygen in the presence of steam using a copper-manganese oxide catalyst having diffraction angles measured by X-ray diffraction analysis of about 36°, about 58° and about 64°; a copper-manganese oxide catalyst suitable for the process. The catalyst is highly active and selective, has a long catalyst-lifetime, gives a non-condensable gas comprising nitrogen, oxygen and nitrous oxide which contains nitrous oxide in a high concentration, and is less deteriorative. The catalyst can be used in a process for preparation of nitrous oxide in which formation of NOx as by-products is reduced; and a process for stably recovering nitrous oxide.

12 Claims, 2 Drawing Sheets

PROCESS FOR PREPARATION OF NITROUS OXIDE

FIELD OF THE INVENTION

This invention relates to a process for preparation of nitrous oxide. In particular, it relates to a process comprising oxidation of ammonia with oxygen in the presence of steam to form nitrous oxide and to a catalyst therefor. Nitrous oxide is a useful compound as an anesthetic, combustion improver for rocket fuel or detergent for semi-conductors.

DESCRIPTION OF THE RELATED ART

The known processes for the preparation of nitrous oxide include (1)ammonia oxidation, (2) decomposition of nitric ammonium and (3) a method based on the reaction of sulfamic acid with nitric acid. Among these, ammonia oxidation(1) is industrially preferable because it uses inexpensive materials, i.e., ammonia and oxygen and gives the product in a high yield.

Several catalysts including $CuO$—$MnO_2$, $Bi_2O_3$ and $Mn_2O_3$—$Bi_2O_3$ have been known for many years to be active in the ammonia oxidation method. It has been, however, known that most of those catalysts may be deteriorated within several hours to several months, as described in, for example, Shokubai Kogaku Koza 10, published by Chijin Shokan, p.412(1967) showing that $CuO$—$MnO_2$ is susceptible to moisture and thus poisoned with water vapor.

Processes for regeneration of a catalyst have been proposed to address the problem of deterioration(See JP-B 30-1225) For example, there has been disclosed a process for preparation of practical and deterioration-resistant catalysts comprising completely washing out ammonium nitrate generated during the preparation process of the catalyst, and $Mn_2O_3$—$Bi_2O3$ prepared as such has been put to a practical use(See Y. Suwa et al., Kogyo Kagaku Zasshi, 64, 1879 (1961)).

Among various ammonia oxidation methods, one which reacts ammonia with oxygen in the presence of steam is safe and industrially preferable because it may directly produce nitrous oxide in a high concentration(See JP-As 5-58607, 5-139710, 6-122505, 6-122506 and 6-122507). These disclose that $CuO$—$MnO_2$, $Bi_2O_3$, $Fe_2O_3$—$Bi_2O_3$—$MnO_2$, $MnO$—$CoO$-$NiO$, $Ba_2O$—$CuO$, $MnO_2$, $Pr_2O_3$—$Nd_2O_3$—$CeO_3$ and Pt catalysts, preferably $CuO$—$MnO_2$ catalysts, can be used.

Various methods are known for the preparation of $CuO$—$MnO_2$ oxides. For example, there has been disclosed a process for preparation of a copper oxide-manganese dioxide catalyst as a catalyst for combustion of carbon monoxide (See J. Am. Chem. Soc., 1982–1987(1921)). The paper also notes that steam as a catalyst poison must be thoroughly eliminated.

In association with X-ray diffraction analysis of $Cu_xMn_{(3-x)}O_4$, its preparation and analyzing methods have been reported(e.g., Ann. Chim.(Paris), 3, 429(1978); Bull. Soc. Chim. Fr., I363(1980); J. Chim. Phys., Phys. Chim. Biol., 86, 1889(1989)).

The product of the ammonia oxidation is cooled to below the condensation temperature of water to remove a majority of moisture, $NO_x$ are, if necessary, removed with aqueous alkaline solution and aqueous alkaline solution containing potassium permanganate, and then nitrogen and oxygen are eliminated.

Processes for separation of nitrous oxide from nitrogen and oxygen include one in which a product is washed with water which absorbs nitrous oxide and then the pressure is released from the high-pressure water containing nitrous-oxide to separate nitrous oxide gas in a high concentration (See JP-B 36-10958).

An improved process of the above is disclosed in which a recovery of nitrous oxide can be improved by the use of two water-washing towers and two gas releasing tower(See JP-B 46-33210).

JP-B 36-10958 shows a process, as a prior art, where a mixed gas comprising nitrous oxide, oxygen and nitrogen is cooled to below −89° C. to separate and concentrate nitrous oxide.

Another process for separation by cooling of nitrous oxide from nitrogen and oxygen has been reported, in which a gas comprising nitrous oxide having a pressure of 15 to 300 bar is cooled to 0 to −88° C. for separating it into gas and liquid phases, the liquid phase of nitrous oxide formed is stripped, and the gas phase is cooled by expansion to be used as a coolant for cooling the gas comprising nitrous oxide(See JP-A 54-20994).

When a copper-manganese oxide prepared according to the prior art is used as a catalyst for preparation of nitrous oxide, its activity may be low or, if it exhibits any activity, a large amount of $NO_x$ as by-products may be formed during the initial phase of the reaction and it may take a long time to give a constant value. It has been also found that the oxide is not a practical catalyst because it has a short lifetime as a catalyst. For example, the usually available oxides among the catalysts described in Y. Suwa et al., Kogyo Kagaku Zasshi, 64, 1879(1961) or JP-A 5-58607 have a poor activity as a catalyst. A copper-manganese oxide prepared by a thermal decomposition method has also a poor activity as a catalyst for preparation of nitrous oxide. It has been found that if the reaction temperature is elevated to improve their activity, selectivity for nitrogen formation may be improved, while that for nitrous oxide decreases, and $NO_x$ as minor impurities also increase.

Particularly, when nitrogen, a main by-product, is separated to collect highly pure nitrous oxide, reduction of selectivity for nitrous oxide causes increase of loss of nitrous oxide along with nitrogen as a by-product, resulting in significant reduction in recovery of nitrous oxide. It has been, therefore, earnestly desired to obtain a catalyst which can give a non-condensable gas comprising nitrogen, oxygen and nitrous oxide which contains nitrous oxide in a high concentration, gives less $NO_x$ as by-products, has a high activity and is not susceptible to deterioration.

To improve the efficiency of a catalyst, it is necessary to increase space velocity. However, as the space velocity is increased at a given temperature, the conversion of ammonia decreases, resulting in a low performance. In such a case, a high conversion of ammonia can be maintained by elevating the temperature, but it has been found that as the temperature rises the amount of $NO_x$, by-products, increases, resulting in a high cost for removing them.

$NO_x$ are so toxic that they must be completely removed. For example, when nitrous oxide is used in a medical practice, its content of $NO_x$ should be reduced below 0.1 ppm. Increase of the space velocity and temperature can improve the efficiency of the catalyst, but is not advantageous due to increase of $NO_x$ as by-products.

A process where separation of nitrous oxide from oxygen and nitrogen is conducted by absorbing nitrous oxide with water under pressure, uses a large amount of water and thus requires a large apparatus, and is uneconomical due to its low recovery of nitrous oxide. For a process comprising collection of nitrous oxide as liquid by cooling, control of cooling is extremely difficult because nitrous oxide has a freezing point of −91.5° C. and a boiling point of −89° C. under ambient pressure, i.e., nitrous oxide can be a liquid in an extremely narrow range of temperature.

When the product gas is cooled to below −89° C., nitrous oxide is frozen and adheres to a heat-transfer part of a heat exchanger, leading to reduction of a cooling efficiency of the gas phase. In other words, increase of adhesion of solid nitrous oxide causes insufficient cooling of the overall product gas, resulting in reduction of the recovery. It may, thus, require removal of the solid nitrous oxide during operation, which may make a continuous, long term operation difficult. When only a gas phase as a coolant is used to avoid freezing of nitrous oxide, a problem of increase of capital investment is caused due to, for example, increase of heat-transfer area of a heat exchanger.

SUMMARY OF THE INVENTION

An object of this invention is to provide a process for preparation of nitrous oxide in which the cost of catalyst is reduced and produces a reduced amount of $NO_x$ as by-products.

Another object of this invention is to provide an efficient process for separation of nitrous oxide from oxygen and nitrogen.

We have intensively attempted to find a catalyst for oxidation of ammonia in the presence of steam which exhibits a high activity and selectivity and has a long lifetime as a catalyst, and thus have found that a copper-manganese oxide catalyst having characteristic diffraction angles in X-ray diffraction analysis has a high activity, exhibits little deterioration for more than a year and surprisingly provides a desired improvement in selectivity for nitrous oxide because of the reduction of formation of nitrogen, a by-product, by elevating the reaction temperature. We have also found that highly-pure nitrous oxide can be obtained from the initial phase of the reaction with a less amount of $NO_x$ even during the initial phase by using a copper-manganese oxide catalyst which is prepared by a precipitation method and then heated at a reaction temperature.

With such a catalyst having characteristic diffraction angles, not only activity but also selectivity can be improved at an elevated temperature. This phenomenon is quite opposite to those usually observed in general. Thus, this invention provides a process for preparation of nitrous oxide, characterized in that ammonia is reacted with oxygen in a reaction zone of ammonia in the presence of steam and a copper-manganese oxide catalyst having diffraction angles of at least about 36°, about 58° and about 64°, to give a product gas comprising nitrous oxide.

We have also developed a reaction method in which the catalyst is highly efficient and forms a reduced amount of $NO_x$ as by-products. We have also found that for a low-temperature separation of nitrous oxide from oxygen and nitrogen, the size of the heat exchanger can be reduced and highly pure nitrous oxide can be constantly separated by heat exchange of nitrous oxide with a liquefied gas as a coolant in the state of mixed phase comprising gas and liquid phases.

DETAILED DESCRIPTION OF THE INVENTION

Figure 1:
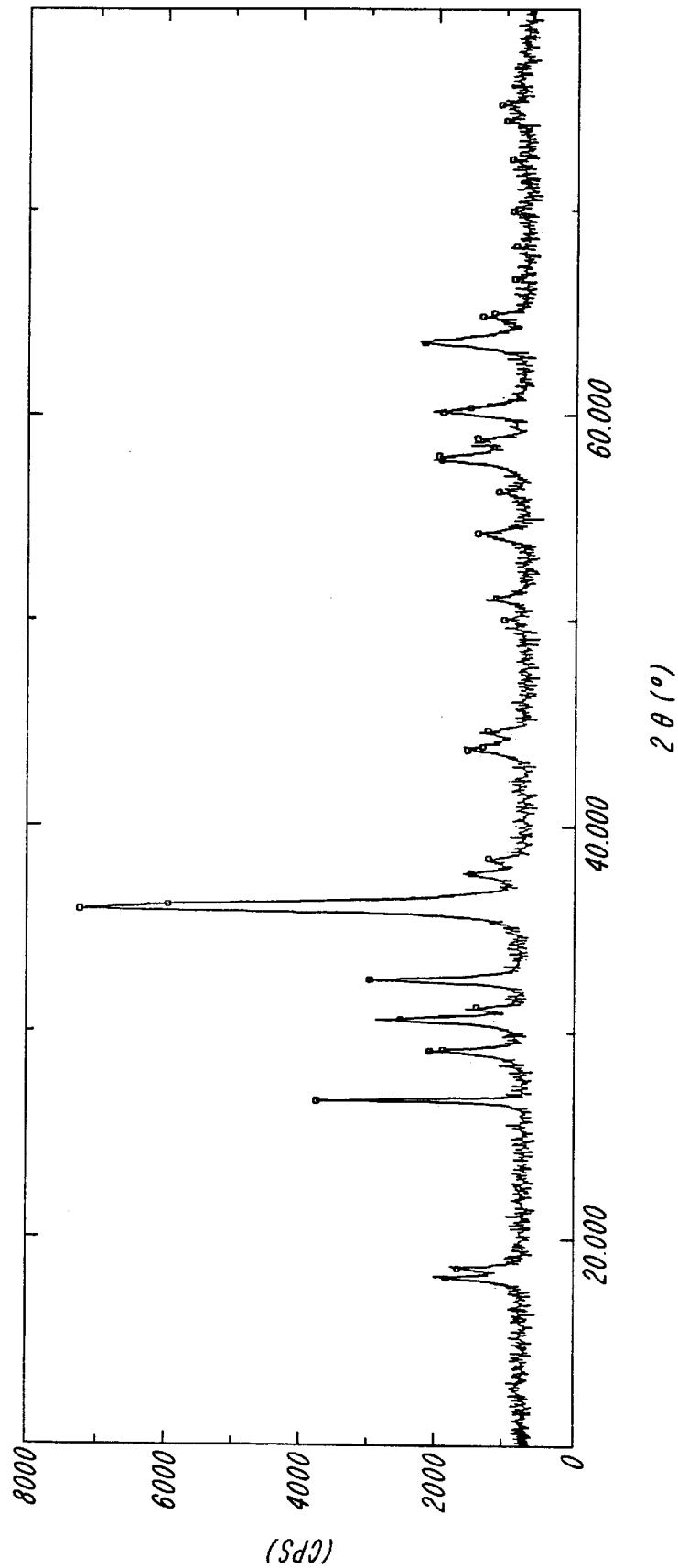
FIG. 1 shows the results of X-ray diffraction analysis of the catalyst according to Example 1, where diffraction angles(2θ value, tube valve: Cu—Kα1 ray, measurement range: 0° to 80°), 35.94°(relative intensity: 100), 57.74°(26) and 63.46°(30) are observed. In addition, $Mn_2O_3$ may be assigned to the angles, 28.96°, 32.48°, 58.80° and 60.04°, and graphite used for tablet compression to 26.54°.
Figure 2:
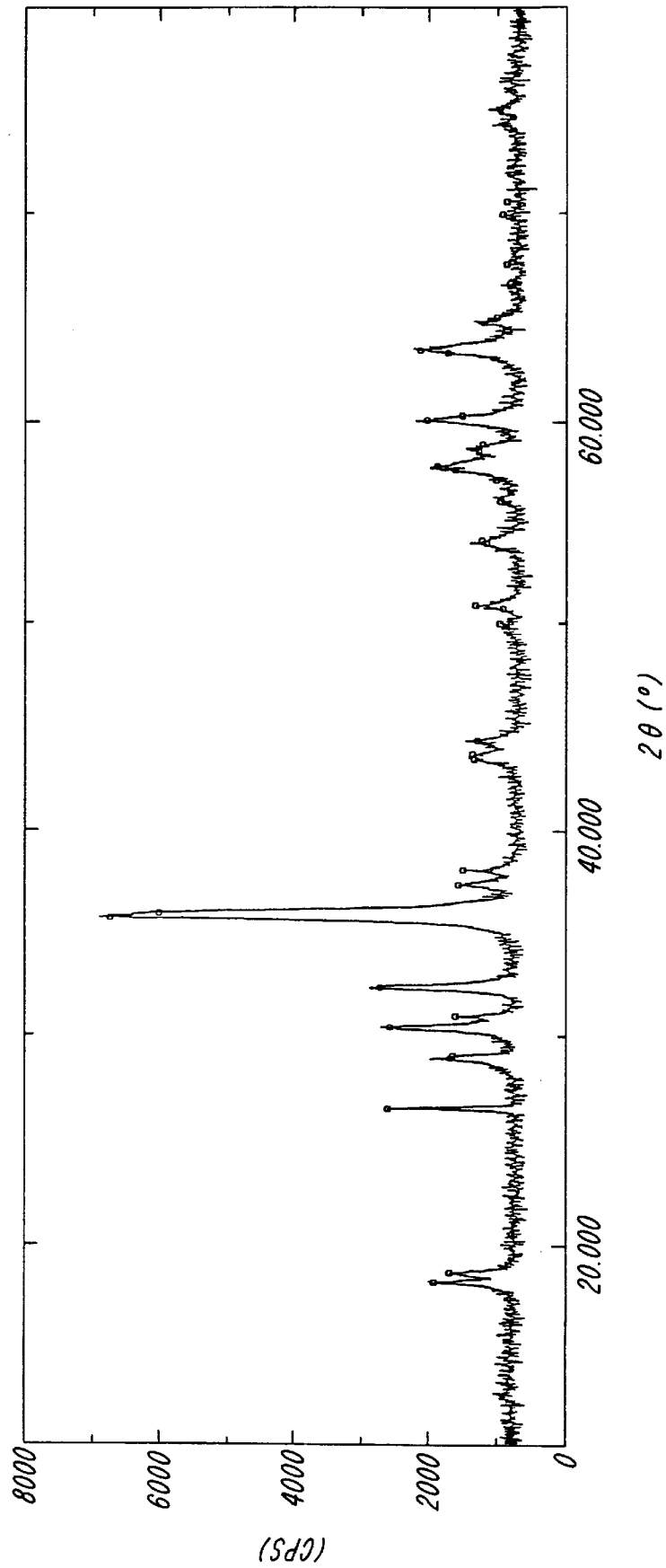
FIG. 2 shows the results of X-ray diffraction analysis of the catalyst according to Example 2 under the same measurement conditions as those of Example 1, where diffraction angles, 35.86°(relative intensity: 100), 57.60°(24) and 63.38°(32) are observed. In addition, $Mn_2O_3$ may be assigned to the angles, 28.92°, 32.40°, 58.82° and 60.02°, and graphite used for tablet compression to 26.48°.

This invention is detailed below.

Catalysts used in this invention are copper-manganese oxides with at least about 36°, about 58° and about 64° of diffraction angles in X-ray diffraction analysis(2θ, tube valve: Cu—Kα1 ray, wavelength: λ=1.5406 Å, measurement range: 0° to 80°). Since depending on some conditions such as dryness, each of the diffraction angles may vary within about 1°~2° and their relative strength also may slightly vary, the above X-ray diffraction angles can be expressed as 35.5° to 36.5°, 57.0° to 58.0° and 62.5° to 64.5°.

This invention is characterized in a catalyst comprising a copper-manganese oxide with such diffraction angles. Compounds in a X-ray data file with diffraction angles very close to the above values are only $Cu_1Mn_2O_4$, $Cu_{1.2}Mn_{1.8}O_4$, $Cu_{1.4}Mn_{1.6}O_4$ and $Cu_{1.5}Mn_{1.5}O_4$(See Table 1), whose diffraction angles are almost similar, showing that they may form a solid solution. The catalysts used in this invention can be identified as $Cu_xMn_{(3-x)}O_4$ where x is 1.0 to 1.5. These are in an equilibrium expressed by the following equation at a high temperature, and therefore, are substantially an identical compound.

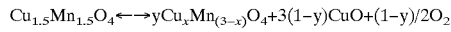

$$Cu_{1.5}Mn_{1.5}O_4 \longleftrightarrow yCu_xMn_{(3-x)}O_4 + 3(1-y)CuO + (1-y)/2O_2$$

wherein x=3(2y−1)/2y and 1<x<1.5.

In other words, the catalysts used in this invention are, in literature, $Cu_xMn_{(3-x)}O_4$ where x is 1.0 to 1.5, and oxides whose valences of Cu and Mn are different to some extent may be also within this invention.

In addition to copper and manganese, the catalysts can contain cations which can form a solid solution such as silver, iron and chromium. Furthermore, this invention includes a precursor which may form a copper-manganese oxide having the above diffraction angles under reaction conditions.

The catalysts used in this invention are prepared by combining one of manganese dioxide and cupric oxide in the course of its preparation via a precipitation method and the other oxide or the other's precursor in the course of its preparation via a precipitation method in a solvent and by separating and drying a precipitate formed. Simple mixing and calcining of dry manganese dioxide and dry cupric oxide will give an oxide having different diffraction angles rather than a highly active catalyst.

A copper-manganese oxide can be prepared by a thermal decomposition process, for example a process where manganese acetate or manganese nitrate is mixed with cupric acetate, cupric carbonate or cupric nitrate and the mixture obtained is subject to a thermal decomposition without a precipitant such as sodium hydroxide and potassium hydroxide, but it has different diffraction angles and a low activity.

The precipitation method of this invention should be distinguished from a thermal decomposition and a coprecipitation method is included in this invention. Manganese oxide from precipitation can be prepared by using a widely-used known process. For example, a manganese compound such as manganese nitrate and manganese acetate is dissolved in water(hereinafter this state is referred to as Mn—A); a precipitant such as sodium hydroxide, potassium hydroxide, sodium carbonate and ammonia is added; and a precipitate derived from manganese compound formed is washed with water (Mn—B, which can include one before washing with water) and dried(Mn—C).

Copper oxide from precipitation can be prepared by using a widely-used known process. For example, a precipitant is added to an aqueous solution of a copper compound such as cupric nitrate, cupric carbonate and cupric acetate (Cu—A); and a precipitate derived from copper compound formed is washed with water(Cu—B, which can include one before washing with water) and dried(Cu—C). Known compounds can be used as the manganese compound, copper compound and precipitant.

Depending on starting materials and a drying temperature, Mn—C and Cu—C can have different forms such as various oxides, hydroxides and ammonium salts, and it may be acceptable that these are considered to be substantially equivalent to manganese dioxide or cupric oxide in terms of preparation of the catalyst.

For the copper-manganese oxide catalysts of this invention, it is essential that either manganese or copper compound is prepared by the above precipitation method and mixed with the other in an aqueous solution and dried. Without mixing in an aqueous solution, a catalyst formed has neither characteristic diffraction angles nor a high activity.

The precursor in the course of preparation of manganese or copper oxide of this invention by a precipitation method includes Mn—A, Mn—B and Mn—C or Cu—A, Cu—B and Cu—C in the above examples, or any manganese or copper compound during the above processes. The manganese or copper compounds can be prepared by the use of a precipitation method. A Mn compound as an aqueous Mn—A, Mn—B or Mn—C solution or suspension is mixed with a Cu compound as an aqueous Cu—A, Cu—B or Cu—C solution or suspension prepared by the precipitation method. Preferably, prior to addition of alkali, a precursor (Mn—A or Cu—A) in the course of preparation of either manganese or copper oxide is mixed with the other oxide or a precursor in the course of preparation of the other oxide by the precipitation method. Alkali is added to the mixture to obtain a precipitate which is then dried.

For example, the above Mn—C and Cu—A are mixed, a precipitant is added, and a precipitate formed is washed and dried. More specifically, sodium hydroxide is added to manganese nitrate, and a precipitate derived from manganese nitrate is filtered, washed and dried at 80° to 150° C. This precipitate is suspended in water, an aqueous solution of cupric nitrate as a starting material and a precipitate is formed with alkali such as sodium carbonate. This precipitate is filtered, washed and dried at 80° to 150 ° C. In this case, a manganese dioxide such as Mn—C prepared by the precipitation method is preferable, but a manganese dioxide prepared by electrolysis or so forth can be used. A copper compound and precipitant as a starting material can be a copper salt prepared by a known precipitation method and a widely-used alkali, respectively.

As another example, the above Mn—A and Cu—C are mixed, a precipitant is added and a precipitate formed is washed and dried. Specifically, alkali such as sodium carbonate is added to an aqueous solution of cupric nitrate, and a precipitate derived from cupric nitrate is filtered, washed and dried at 80° to 150° C. This dried cupric oxide is suspended in water, an aqueous solution of manganese nitrate as a starting material is added to the suspension, and a precipitate is formed with alkali such as sodium carbonate. This precipitate is filtered, washed and dried at 80° to 150° C. In this case, cupric oxide prepared by a precipitation method is preferable, but cupric oxide prepared by a thermal decomposition can be used. A manganese compound and precipitant as a starting material can be ones widely-used in a known precipitation method.

Furthermore, a so-called co-precipitation method comprising mixing of Mn—A and Cu—A, adding a precipitant and washing and drying, can be used.

Furthermore, a process where Mn—C and Cu—C are suspended in water and a precipitate formed is filtered, washed dried at 80° to 150° C. under a reduced or ambient pressure, can be used.

In both cases, the precipitate is dried under a reduced or ambient pressure preferably at 80° to 150° C., more preferably at 100° to 130° C.

A proportion of copper and manganese is adjusted when cupric nitrate or manganese acetate as a starting material is added. Excessive copper in the catalyst causes reduction of its activity, and when the catalyst comprises cupric oxide and manganese dioxide, a strength of the catalyst may be reduced if a proportion by weight of manganese dioxide to cupric oxide is more than 5. The proportion of manganese dioxide to cupric oxide is, therefore, preferably at least 1 and 5 or less by weight, more preferably at least 2 and 4 or less.

During this step, if necessary, a copper-manganese oxide can be supported on a carrier such as silica, or can be molded. In molding, a binder and a lubricant such as graphite can be used. A copper-manganese oxide thus obtained is calcined in the presence of oxygen for 3 to 24 hours under an ambient pressure at up to 600° C., preferably 200° to 600° C., more preferably 250° to 500° C.

In the field of catalyst, air calcining is generally conducted at a temperature higher than a reaction temperature in order to improve a lifetime of the catalyst. In contrast, if a copper-manganese oxide catalyst prepared by a precipitation method is calcined at a temperature higher than the reaction temperature, the lifetime of the catalyst is reduced. If the calcining temperature is over 600° C., relative intensities of the desired diffraction angles are reduced, indicating that the catalyst comprises a copper-manganese oxide substantially different from that of this invention. Such a catalyst has a poor activity and a short lifetime.

It is preferable to use steam in the calcining because it gives a stable catalyst with forming a reduced amount of $NO_x$ even during the initial phase of the reaction. Thus, calcining for at least 3 hours at 250° to 500° C. in contact with steam is preferable because $NO_x$ concentration during the initial reaction phase is reduced and the lifetime of the catalyst is considerably increased.

When the proportion between copper and manganese falls in the above range, a copper-manganese oxide having the desired diffraction angles can be provided, while when manganese is excessive, the excessive amount is reflected in diffraction angles of $Mn_2O_3$. Thus, a copper-manganese oxide having characteristic diffraction angles can be prepared.

The catalyst of this invention is generally placed in a tubular reactor, to which a mixed gas comprising steam, ammonia and oxygen is supplied at a space velocity of 100 to 100,000/hr converted to the conditions of 0° C. and 1 atm, preferably at 500 to 50,000/hr For this invention, it is recommended that when oxidizing ammonia with oxygen in the presence of steam, the gas at the inlet of the reactor contains more than 50 vol % of steam because it can be particularly effective in preventing deterioration of a catalyst activity. In addition, there is a risk of explosion in the oxidation reaction of ammonia depending on the concentration of ammonia. The lower limit of explosion for ammonia is 15 vol %. Thus, to avoid the explosion range, the concentration of ammonia in the reaction gas is reduced to less than 15 vol % by means of dilution with oxygen or nitrogen, preferably below 10 vol % for safety.

When diluting with oxygen or nitrogen as such, a reaction efficiency becomes low due to an insufficient concentration of ammonia, and it may be needed to separate nitrous oxide from excessive oxygen or nitrogen contained in the product gas.

Meanwhile, we have found that when a steam concentration in the process of this invention is at least 50 vol %, preferably at least 60 vol %, the explosion range can be avoided regardless of the molar ratio of ammonia or oxygen. Thus, when the steam concentration at the inlet of the reactor is over 60 vol %, excessive oxygen or nitrogen may not be used for dilution, and nitrous oxide can be easily separated in a high concentration. The concentration of steam used at the inlet of the reactor is preferably at least 50 vol %, more preferably at least 60 vol %.

Ammonia used for this invention can be, of course, pure ammonia and also aqueous ammonia. Aqueous ammonia obtained by cooling the reaction gas into a non-condensable gas comprising nitrous oxide, oxygen and nitrogen and aqueous ammonia can be recycled into the reactor. Although as stated above, the concentration of ammonia at the inlet of the reactor is preferably below 10 vol % to avoid the explosion range, the limitation can be eliminated by using steam at a concentration of at least 60 vol %, where the concentration of ammonia at the inlet of the reactor is 1 to 30 vol %, preferably 1 to 20 vol %.

Oxygen used as an oxidizing agent in the process of this invention can be, of course, pure oxygen, and oxygen containing nitrogen or air can be also used. However, as stated above, use of oxygen diluted with more nitrogen and the like should be avoided because it causes reduction of concentration of nitrous oxide in a product gas; the amount of oxygen to one mole of ammonia is preferably 0.3 to 3.0 moles, more preferably 0.5 to 1.5 moles.

The rate of supplying the mixed gas comprising ammonia, oxygen and steam does not significantly affect the selectivity for nitrous oxide. However, if the rate is too low, the size of the reactor may be uneconomically increased, while if it is too high, conversion of ammonia may be reduced. The rate of supplying of the mixed gas is, therefore, 100 to 100,000/hr, preferably 500 to 50,000/hr as a space velocity converted to the conditions of 0° C. and 1 atm.

To improve the yield of nitrous oxide per unit volume of the reactor(catalyst), it is preferable to select a velocity of 2,000 to 50,000/h. If the space velocity is increased to reduce the size of the reactor and the catalyst cost, then the load of the reactants to the catalyst increases and conversion of ammonia is reduced. In such a case, the reaction temperature may be elevated to maintain the activity of the catalyst and thus the conversion of ammonia. Furthermore, in the case that the catalyst has been used for a long time, resulting in reduction of the conversion of ammonia, elevation of the reaction temperature may allow the conversion of ammonia to be maintained.

When the catalyst of this invention is used, its activity as well as, surprisingly, selectivity for production of nitrous oxide can be improved with elevation of the reaction temperature, and also $NO_x$ can be reduced. If the temperature is excessively elevated, the conversion is unchanged, while the activity and $NO_x$ are increased. Thus, the temperature can be elevated as long as the amount of $NO_x$ is acceptable. Further elevation of the temperature is not preferable because it causes increase of nitrogen and reduction of the selectivity for nitrous oxide. The reaction temperature should be, therefore, between 250° and 450° C., preferably between 250° and 380° C. In this invention, the reaction temperature is defined as the temperature at the outlet of the reactor in operation.

Meanwhile, if the difference between the highest temperature of the catalyst in the reaction zone and gas temperature at the outlet of the reactor becomes too large, $NO_x$ may sharply increase and then cause the undesirable increase of load to a facility for removing $NO_x$.

In such a case, it is preferable that the difference between the highest temperature of the catalyst in the reaction zone and the gas temperature at the outlet of the reactor is controlled within the range of 0° to 120° C. If the difference between the highest temperature of the catalyst in the reaction zone and the gas temperature at the outlet of the reactor is more than 120° C., $NO_x$ may increase probably because some of nitrous oxide or nitrogen formed is further oxidized into $NO_x$. The term $NO_x$ herein refers to nitrogen oxides other than nitrous oxide, mainly representing nitrogen monoxide and nitrogen dioxide.

To adjust the difference between the highest temperature of the catalyst in the reaction zone and the gas temperature at the outlet of the reactor within the above range, it is preferable to use a reactor equipped with a heat remover such as a fixed bed type of reactor using multitubular or intermediate heat exchange or a fluidized bed type of reactor with a heat remover. With such a type of reactor, the difference between the highest temperature of the catalyst in the reaction zone and the gas temperature at the outlet of the reactor is adjusted by controlling, for example, the flow rate of the coolant for heat removal. Alternatively, the concentration of ammonia can be reduced, but it requires increase of the amount of steam used.

The product gas obtained via the above reaction contains little $NO_x$ as by-products. The product gas is cooled to below the boiling point of water to be separated into a non-condensable gas comprising nitrous oxide, oxygen and nitrogen and water and ammonia. The $NO_x$ can be completely removed by a subsequent purification process. Such a small amount of $NO_x$ can be removed by, for example, a process comprising washing the non-condensable gas with a solution of potassium permanganate in aqueous sodium hydroxide and aqueous sulfuric acid. Furthermore, oxygen and nitrogen are separated out to give a highly pure nitrous oxide.

Although the pressure in the reaction zone in the process of this invention is not limited, a higher pressure is preferable because of reduction of the volume of the reactor. However, a pressure higher than 10 kg/cm²-G is not preferable because it may lead to increase of the cost of the reaction apparatus as well as expansion of the explosion range of ammonia, resulting in lowering in safety. The reaction pressure should be, therefore, between 0 and 10 kg/cm²-G, preferably between 1 and 10 kg/cm²-G, more preferably between 1 and 5 kg/cm²-G.

The product gas thus obtained is cooled to below the boiling point of water to be separated into water and a non-condensable gas comprising nitrous oxide, oxygen and nitrogen The non-condensable gas usually contains nitrous oxide in a concentration of about 40° to 90 vol %.

Furthermore, the small amount of nitrogen oxides are, if necessary, removed by contact of the product gas with an aqueous alkaline solution and an aqueous alkaline solution containing potassium permanganate; the moisture in the gas is removed; and nitrous oxide is liquefied and separated by cooling the product gas under pressure.

Coolants for liquefying nitrous oxide can be materials having a boiling point between −40° and −240° C., preferably between −60° and −200° C., more preferably between −90° and −200° C. If the boiling point of the coolant is higher than −40° C., a cooling temperature is so high that a recovery may be reduced. In this case, in order to improve the recovery, the gas containing nitrous oxide should be cooled under a higher pressure. A coolant having a boiling point of lower than −240° C. causes a local cooling, by which freezing may occur more frequently.

Coolants which can be used in this invention include chlorine, oxygen, nitrogen, argon, xenon, krypton, ammonia, methane, ethane, ethylene, propane, cyclopropane, propylene, and CFCs 12, 13, 22, 23, 41 and 116, among which oxygen, nitrogen, argon, xenon, krypton, and CFCs 13, 22, 23, 41 and 116 are preferable because they are less corrosive and incombustible when mixed into nitrous oxide. In particular, oxygen and nitrogen are preferable because they will cause no environmental problems when released in the atmosphere.

It is important in this invention that the coolant should be in a mixed-phase state comprising liquid and gas phases. By using a liquid coolant, heat of vaporization during vaporization of the liquefied coolant can be utilized, so that the heat transfer area of the heat exchanger can be reduced. Coexistence of gas and liquid phases can prevent local cooling and thus freezing of nitrous oxide.

This coolant can be in a thermally homogeneous state obtained by mixing of liquid and gas, or in a mixed-phase state of liquid phase and gas phase generated by partial vaporization of the liquid phase. Alternatively, liquid and gas precooled to its condensation temperature can be mixed at the inlet of the heat exchanger and then introduced into the heat exchanger. In any case, the ratio of liquid/gas at the inlet of the heat exchanger should be 1/0.05 to 1/20 by weight, preferably 1/0.1 to 1/10. If the ratio is higher than 1/0.05, nitrous oxide may tend to freeze. Once freezing of nitrous oxide occurs, the freezing proceeds in the heat-transfer portion of the heat exchanger or the contact zone of the solidified nitrous oxide with the gas phase, resulting in occlusion of the heat exchanger.

Additionally, a solid state of nitrous oxide deposits on the heat-transfer portion of the heat exchanger, causing reduction of overall heat transfer coefficient and thus insufficient cooling of the entire gas phase, so that the recovery of nitrous oxide may be reduced. A ratio of liquid/gas lower than 1/20 may require increase of the heat-transfer area of the heat-exchanger, resulting in increase of capital investment.

There are no limitations in the manner of introduction of the coolant in the heat exchanger; it can be introduced in the state that gas and liquid have been fully mixed, or that the gas and liquid phases may be separately introduced into the heat exchanger. In any case, it is preferable that gas and liquid are well mixed in the heat exchanger. Coolant used in cooling can be recovered and recycled.

The gas containing nitrous oxide is cooled under pressure. Application of pressure can make the condensation temperature of nitrous oxide higher, so that it becomes easier to recover nitrous oxide as liquid, resulting in improvement of its recovery. The pressure applied is generally between 10 and 100 kg/cm2-G, preferably between 10 and 50 kg/cm2-G. When the pressure is equal to or higher than 10 kg/cm2-G, nitrous oxide can be easily recovered and its recovery can be improved. When the pressure is equal to or lower than 100 kg/cm2-G, energy for applying pressure can be reduced, and thus the operation cost and the capital investment can be also reduced.

Heat exchange between the coolant and the gas containing nitrous oxide can be performed in either parallel or counter flow. Practically, parallel flow is superior in preventing local cooling and thus freezing of nitrous oxide.

Under the above conditions, nitrous oxide is cooled to −40° to −90° C. to be condensed and then separated from nitrogen and oxygen. The liquefied nitrous oxide may be distilled and then be re-condensed by cooling. Nitrous oxide thus obtained has a concentration of at least 99% and its recovery may be at least 90%.

EXAMPLES

This invention will be more specifically described the following Examples.

Example 1

Sodium carbonate was added to a manganese acetate aqueous solution, the precipitate formed was filtered, washed and dried at 130° C. The dried precipitate was suspended in water. Cupric nitrate was added to the suspension in the amount that the proportion by weight of the precipitate derived from manganese acetate and the precipitate derived from cupric nitrate came to be 75:25 assuming that they are in the forms of manganese dioxide and cupric oxide, respectively. Sodium carbonate was added to the suspension to form a precipitate, which was filtered, washed and dried at 130° C. Graphite was then added, the mixture was compressed into a tablet, and then it was calcined in the presence of steam and oxygen at 350° C. for 12 hours.

X-ray diffraction analysis for this copper-manganese oxide gave the results shown in Table 1 indicating characteristic diffraction angles, i.e., 35.94°(relative intensity: 100), 57.74°(26) and 63.46°(30). Diffraction angles, 18.02°, 30.50°, 43.60° and 54.14°, were also observed. Diffraction angles, 28.96°, 32.48°, 58.80°, 60.04° and so forth showed presence of a small amount of Mn2O3(See FIG. 1).

X-ray diffraction analysis was conducted using RINT-Type 1500(Rigaku Co., Ltd.), where the measurement conditions were X-ray: CuKα1(wavelength 1.5406 Å), tube voltage: 50 kV, tube current: 200 mA, divergence slit: 1 deg., scattering slit: 1 deg., and photo-receiving slit: 0.15 mm; in the following Examples and Comparative Examples the similar conditions were used.

Five hundred grams(500 g) of the catalyst was placed in a tubular reactor with i.d. 2.8 cm, into which ammonia, oxygen and steam were then introduced in proportions of 3.8, 3.9 and 92.3 vol %, respectively. Reaction was initiated at 320° C. under the pressure of 0.5 kg/cm2-G. The product gas was cooled to 30° C. and the gas phase was analyzed; nitrous oxide: 75.1 vol %, nitrogen: 11.7 vol % and oxygen: 13.1 vol % The reaction temperature was elevated by 10° C. and then the gas phase was analyzed; nitrous oxide: 77.2 vol %, nitrogen: 12.1 vol % and oxygen: 10.7 vol %. From the liquid phase, a small amount of ammonia was detected. The conversion of ammonia was 99%.

The reaction temperature was then lowered to 320° C. and the reaction was continued for 12 months, while the activity of the catalyst and the concentration of nitrous oxide were not changed in comparison with those in the initial phase of the reaction. The concentration of NOx was initially 430 ppm and became 50 ppm after 3 days, which was stable between 20 to 50 ppm.

The product gas(gas phase) was passed through an alkaline solution containing potassium permanganate to remove NOx, was cooled to about −80° C. under the pressure of 10 kg/cm2-G to liquefy nitrous oxide and separate oxygen and nitrogen. Nitrous oxide obtained had a purity of equal to or higher than 99%, showing a satisfactory quality.

Example 2

A precipitate derived from manganese compound prepared by a precipitation method was filtered, washed and dried at 120° C. A precipitate derived from copper compound prepared by a precipitation method was filtered, washed and dried at 120° C. These precipitates were blended in the proportion by weight of 75:25 as manganese dioxide: cupric oxide. The mixture was suspended in water and a precipitate was filtered, washed and dried at 120° C.

Graphite was then added to the dried precipitate and the mixture was compressed into a tablet Five hundred grams (500 g) of the catalyst was placed in a tubular reactor with i.d. 2.8 cm; was subjected to continuous contact with steam and air at 320° C. for 24 hours; and a small amount of the catalyst was removed to be analyzed by a X-ray diffraction method, which gave the results shown in Table 2, indicating a catalyst having diffraction angles of 35.86°, 57.60° and 63.38°.

Then, a starting gas with a composition similar to that of Example 1 was supplied and the mixture was reacted at 330° C. The product gas was cooled to 30° C. and analysis of the gas phase showed the concentration of nitrous oxide was 77.2 vol % Analysis of the liquid phase indicated that a conversion of ammonia was 98%. The concentration of NOx was initially 260 ppm and became 20 to 50 ppm after 3 days, which was unchanged thereafter.

Example 3

Using the mixture of dried precipitate derived from copper and manganese compounds in Example 2 was treated as described in Example 1, except that the mixture was calcined at 520° C. for 24 hour under an air flow, instead of at 320° C. for 24 hours in continuous contact with steam and air. X-ray diffraction analysis indicated a copper-manganese oxide having diffraction angles of 36.07°, 57.74° and 63.45° as shown in Table 2.

Then, a reaction as described in Example 1 was conducted. The product gas obtained was cooled to 30° C. Analysis of the gas phase showed the concentration of nitrous oxide was 74.6 vol %. Analysis of the liquid phase indicated that a conversion of ammonia was 96%. The concentration of NOx was initially 970 ppm and reduced to 100 to 150 ppm after 7 days, which was unchanged thereafter. The activity of the catalyst was sustained for 6 months, and showed a tendency to decline thereafter.

Example 4

To a wet precipitate derived from manganese compound in water prepared by a precipitation method was added a precipitate derived from copper compound which had been prepared by a precipitation method, washed and dried at 130° C., to form a suspension. Here, the amount of the precipitate derived from copper compound was selected to make the proportion by weight as manganese dioxide and copper oxide 78:22. The precipitate in the suspension was filtered and dried at 135° C. It was then heated to 400° C. and calcined at the temperature for 24 hours under a flow of steam and air.

In X-ray diffraction analysis, the copper-manganese oxide obtained showed diffraction angles of 35.94°, 57.73° and 63.42° as shown in Table 2.

Using a glass tube with i.d. 1 cm as a reactor, the uncompressed catalyst was diluted to 1/10 with glass beads and placed in the reactor up to the level of 2 cm.

A reaction as described in Example 1 was conducted, except that ammonia, oxygen and steam were supplied in proportions of 4.1, 4.3 and 91.6 vol %, respectively, a reaction temperature was 330° C. and a reaction pressure was almost ambient pressure. The product gas obtained was cooled to 10° C. and analysis of the gas phase showed the concentration of nitrous oxide was 73.7 vol %. Analysis of the liquid phase indicated that a conversion of ammonia was 98%. The concentration of NOx was initially 230 ppm.

Example 5

A catalyst was prepared as described in Example 4, except that a precipitate derived from manganese compound in water and a dried precipitate derived from copper compound were mixed in water in the proportion by weight of 40:60 as manganese dioxide and cupric oxide, filtered, and dried at 120° C., and that it was calcined at 520° C. for 24 hours in the air. From X-ray diffraction analysis, the copper-manganese oxide obtained showed diffraction angles of 35.91°, 57.71° and 63.42° as shown in Table 2 although the proportion between the starting materials was different from Example 1. In addition, a small amount of CuO was found from the diffraction angles observed.

Then, a reaction as described in Example 4 was conducted, except that the above catalyst was used. The product gas obtained was cooled to 10° C. Analysis of the gas phase showed the concentration of nitrous oxide was 75.8 vol %. Analysis of the liquid phase indicated that a conversion of ammonia was 95%. The initial concentration of NOx was 920 ppm.

Example 6

Sodium carbonate was added to an aqueous solution of cupric nitrate, and a precipitate formed was washed and dried at 120° C. under a reduced pressure. The dried precipitate was suspended in water, to which manganese nitrate was then added in an amount to make a proportion by weight as manganese dioxide and cupric oxide 67:33. Sodium carbonate was added to the suspension to form a precipitate, and the precipitate formed was filtered, washed and dried at 120° C. It was then heated to 400° C. and calcined at 400° C. for 24 hours under a flow of steam and air. X-ray diffraction analysis for the catalyst obtained showed that it was a copper-manganese compound with diffraction angles of 35.89°, 57.67° and 63.45° as shown in Table 2. Then, a reaction as described in Example 4 was conducted, except that the above catalyst was used. Analysis of the gas phase obtained showed that the concentration of nitrous oxide was 74.0 vol %. Analysis of the liquid phase indicated that a conversion of ammonia was 97%. The initial concentration of NOx was 290 ppm.

Comparative Example 1

A mixture of cupric acetate and manganese acetate was used, after a precipitant was added, the precipitate formed was filtered, washed and dried at 150° C. and calcined at 650° C. for 15 hours in air, where the amounts of the starting acetates were selected to make a proportion by weight as manganese dioxide and cupric oxide 1:1 assuming that the acetates would be converted into the oxides, respectively. X-ray diffraction analysis showed that the product was a copper-manganese oxide with diffraction angles of 35.0°, 29.0°, 33.5°, 36.1° and 29.8° in order of relative intensity. Then, a reaction as described in Example 4 was conducted, except that the above catalyst was used. The product gas was cooled to 10° C. and analyzed for the gas phase obtained, showing that the concentration of nitrous oxide was 8.3 vol %. The conversion of ammonia was 25%.

Comparative Example 2

Manganese dioxide and cupric oxide were mechanically mixed in a proportion by weight of 1:1, and the mixture was calcined at 750° C. for 10 hours in the air. X-ray diffraction analysis showed that the product was a CuO—MnO2 catalyst mainly with diffraction angles of 35.6°, 37.1°, 38.7° and 56.0°. Then, a reaction as described in Example 4 was conducted, except that the above catalyst was used. The product gas was cooled to 10° C. and analyzed for the liquid phase obtained, showing that a conversion of ammonia was 16% which was little improved by elevating the temperature. The concentration of nitrous oxide was 2.2 vol %.

Comparative Example 3

Manganese dioxide and cupric oxide were mechanically mixed in a proportion by weight of 2:1, and the mixture was calcined at 350° C. for 24 hours in the air. X-ray diffraction analysis showed diffraction angles of 35.6°, 37.1°, 38.7° and 56.0° which were the same as before calcining. Then, a reaction as described in Example 4 was conducted, except that the CuO—MnO2 catalyst was used. The product gas was cooled to 10° C. and analyzed for the liquid phase obtained, showing that a conversion of ammonia was 21% The concentration of nitrous oxide in the gas phase was 1.9 vol %.

Comparative Example 4

A reaction as described in Example 4 was conducted, except that the catalyst used was commercially available CuO—MnO2 having mainly diffraction angles of 35.6°, 37.1°, 38.7° and 56.0° in X-ray diffraction analysis(Toyo CCI Co., Ltd., content of cupric oxide: 68 wt %). The conversion of ammonia was 19% and the concentration of nitrous oxide in the gas phase was 2.2 vol %.

Comparative Example 5

A reaction as described in Example 4 was conducted, except that the catalyst used was one calcined at 650° C. in the presence of steam and air according to a procedure of Example 2, which showed a complex diffraction pattern comprising diffraction angles assigned to CuO, Mn2O4, MnO2 and so forth. Analysis indicated that the concentration of nitrous oxide was 24.1 vol % and a conversion of ammonia was 59%.

Example 7

Five hundred grams (500 g) of CuO—MnO2 catalyst prepared as described in Example 1 was placed in a double-tubular heat exchanger type of reactor whose cylindrical part had an internal diameter(i.d.) of 2.8 cm, and monoethyl biphenyl as a coolant was forced a circulated in the jacket of the cylindrical part. Into this reactor, ammonia, oxygen and steam were then introduced in proportions of 4, 4 and 92.0 vol %, respectively. Reaction was initiated under the following conditions; the highest temperature of the catalyst in the reaction zone: 362° C., a temperature of the product gas at the outlet of the reactor: 300° C., a space velocity: 7500/hr and a reaction pressure: 0.5 kg/cm2-G. The highest temperature of the catalyst in the reaction zone was adjusted via the flow rate of the heat medium.

The product gas was cooled to 30° C. and the gas phase was analyzed; nitrous oxide: 74.5 vol %, nitrogen: 16.4 vol % and oxygen: 9.1 vol %. Ammonia was not detected. Analysis of the liquid phase showed that a conversion of ammonia was 99%. The gas phase contained 28 ppm of NOx(38 ppm on the basis of nitrous oxide).

Example 8

A reaction as described in Example 7 was conducted, except that the highest temperature of the catalyst in the reaction zone was 380° C. and a temperature of the product gas at the outlet of the reactor was 310° C. The product gas was cooled to 30° C. and the gas phase was analyzed; nitrous oxide: 75.5 vol %, nitrogen: 16.3 vol % and oxygen: 8.2 vol %. Ammonia was not detected. Analysis of the liquid phase showed that a conversion of ammonia was 99%. The gas phase contained 38 ppm of NOx(50 ppm on the basis of nitrous oxide).

Example 9

The gas containing nitrous oxide prepared as described in Example 1 was completely dried, compressed to 20 kg/cm2-G with a compressor and introduced into a heat-exchanger for condensation of nitrous oxide. To the heat exchanger were sent, as a coolant, liquid nitrogen and gaseous nitrogen precooled to near its condensation temperature in a proportion by weight of 1:2 at the inlet of the heat exchanger in a parallel flow to the gas containing nitrous oxide, while gradually increasing the flow rate, keeping the proportion by weight of liquid and gas phases.

The gas containing nitrous oxide was thus cooled to −60° C., while freezing of nitrous oxide was not observed, and the operation could be, therefore, continued for 30 days, keeping this state, which implies that a still longer operation may be possible. The recovery of nitrous oxide was 92% as shown in Table 3.

Examples 10 to 17

A procedure as described in Example 9 was conducted, altering a proportion by weight of liquid and gaseous nitrogen as a coolant at the inlet of the heat exchanger, an introduction pressure of the gas containing nitrous oxide into the heat exchanger and the cooling temperature. The results obtained are shown in Table 3. In any of the Examples, freezing of nitrous oxide was not observed.

Example 18

A procedure as described in Example 9 was conducted, except that oxygen was used instead of nitrogen and a proportion by weight of liquid and gas phases was 1:4, at the inlet of the heat exchanger. When the cooling temperature of the gas containing nitrous oxide was −60° C., a recovery of nitrous oxide was the same as that of Example 9 and freezing of nitrous oxide was not observed. Since the operation could be continued for 30 days in this state, a still longer operation may be possible.

In an ammonia oxidation process in which ammonia is oxidized by oxygen, a catalyst having particular diffraction angles can be used to achieve highly selective preparation of nitrous oxide, with a high activity and without its deterioration.

When the reaction is conducted, keeping a difference between the highest temperature of a reaction zone and a gas temperature at the outlet of the reactor within 120° C., NOx generation can be reduced, and when a mixed-phase of liquefied gas comprising liquid and gas phases is used as a coolant for separation of nitrous oxide from nitrogen and oxygen, freezing of nitrous oxide may be prevented, resulting in improvement of its recovery.

As described above, the process of this invention is advantageous for industrial preparation of nitrous oxide in a high concentration.

TABLE 3-continued

| | Liq:Gas | Pressure [kg/cm$^2$–G] | Temperature [°C.] | N$_2$O Recovery [%] |
|---|---|---|---|---|
| Example 15 | 1:10 | 20 | −60 | 92 |
| Example 16 | 1:20 | 20 | −60 | 92 |
| Example 17 | 1:0.5 | 20 | −60 | 91 |

What is claimed is:

1. A process for preparation of nitrous oxide, characterized in ammonia is reacted with oxygen in a reaction zone in the presence of steam by contacting ammonia with a copper-manganese oxide catalyst having diffraction angles measured by X-ray diffraction analysis of at least about 36°, about 58° and about 64°, to give a product gas comprising nitrous oxide.

TABLE 1

A number in a parenthesis is JCPDS* No. in a literature.

| Example 1 | | Cu$_1$Mn$_2$O$_4$ (No. 341400) | | Cu$_{1.2}$Mn$_{1.8}$O$_4$ (No. 351029) | | Cu$_{1.4}$Mn$_{1.6}$O$_4$ (NO. 351030) | | Cu$_{1.5}$Mn$_{1.5}$O$_4$ (No. 351171) | | Cu$_{1.5}$Mn$_{1.5}$O$_4$ (No. 351172) | |
|---|---|---|---|---|---|---|---|---|---|---|---|
| 2θ | R.I[1] | 2θ | R.I | 2θ | R.I | 2θ | R.I | 2θ | R.I | 2θ | R.I |
| 18.02 | 23 | 18.39 | 10 | 18.43 | 9 | 18.47 | 10 | 18.39 | 6 | 18.51 | 6 |
| 30.50 | 35 | 30.20 | 40 | 30.27 | 35 | 30.42 | 40 | 30.44 | 30 | 30.41 | 30 |
| 35.94 | 100 | 35.57 | 100 | 35.67 | 100 | 35.83 | 100 | 36.01 | 100 | 35.96 | 100 |
| — | — | 37.25 | 4 | 37.33 | 4 | 37.49 | 4 | 37.50 | 9 | 37.60 | 8 |
| 43.60 | 21 | 43.25 | 18 | 43.38 | 20 | 43.56 | 18 | 43.67 | 20 | 43.82 | 18 |
| 54.16 | 19 | 53.72 | 8 | 53.84 | 10 | 54.04 | 10 | 54.13 | 14 | 54.26 | 10 |
| 57.74 | 26 | 57.22 | 25 | 57.39 | 30 | 57.60 | 35 | 57.79 | 50 | 57.87 | 40 |
| 63.46 | 30 | 62.87 | 30 | 63.04 | 40 | 63.26 | 40 | 63.83 | 60 | 63.78 | 45 |
| — | — | 71.29 | 2 | 71.51 | 3 | 71.84 | 5 | 71.90 | 6 | 66.87 | 2 |
| — | — | 74.34 | 5 | 74.60 | 8 | 74.94 | 10 | 75.09 | 14 | 72.16 | 4 |
| — | — | — | | 75.61 | 3 | 75.91 | 4 | 76.29 | 9 | 75.23 | 10 |
| — | — | 79.34 | 1 | 79.62 | 2 | 79.99 | 2 | 80.10 | 4 | 76.37 | 6 |
| — | — | — | | 82.60 | 1 | — | | 82.35 | 2 | 80.37 | 3 |
| — | — | — | | — | | — | | — | | 83.21 | 1 |
| — | — | 87.21 | 4 | 87.48 | 7 | 87.93 | 8 | 88.28 | 7 | 88.28 | 4 |
| — | — | 90.08 | 9 | 90.41 | 20 | 90.89 | 25 | 91.10 | 20 | 91.32 | 14 |
| — | — | 95.26 | 10 | 95.26 | 10 | 95.86 | 10 | 95.94 | 8 | 96.31 | 5 |

*Joint Community Powder Diffraction Standards
[1])R.I.: relative intensity

TABLE 2

| Example 2 | | Example 3 | | Example 4 | | Example 5 | | Example 6 | |
|---|---|---|---|---|---|---|---|---|---|
| 2θ | R. I. | 2θ | R. I. | 2θ | R. I. | 2θ | R. I. | 2θ | R. I. |
| 18.46 | 25 | 18.20 | 25 | 18.31 | 19 | 18.42 | 12 | 18.27 | 23 |
| 30.44 | 38 | 30.94 | 33 | 30.50 | 36 | 30.40 | 40 | 30.48 | 37 |
| 35.86 | 100 | 36.07 | 100 | 35.94 | 100 | 35.91 | 100 | 35.89 | 100 |
| 43.50 | 20 | 43.68 | 19 | 43.58 | 21 | 43.58 | 22 | 43.60 | 21 |
| 54.14 | 18 | 54.14 | 7 | 54.14 | 10 | 54.15 | 18 | 54.14 | 16 |
| 57.60 | 24 | 57.74 | 30 | 57.73 | 25 | 57.71 | 27 | 57.67 | 24 |
| 63.38 | 32 | 63.45 | 24 | 63.42 | 30 | 63.42 | 31 | 63.45 | 30 |

TABLE 3

| | Liq:Gas | Pressure [kg/cm$^2$–G] | Temperature [°C.] | N$_2$O Recovery [%] |
|---|---|---|---|---|
| Example 9 | 1:2 | 20 | −60 | 92 |
| Example 10 | 1:2 | 20 | −50 | 90 |
| Example 11 | 1:2 | 20 | −75 | 96 |
| Example 12 | 1:2 | 10 | −75 | 93 |
| Example 13 | 1:2 | 40 | −75 | 97 |
| Example 14 | 1:2 | 90 | −40 | 96 |

2. A process according to claim 1, wherein the copper-manganese oxide catalyst is that prepared by combining either of manganese dioxide or cupric oxide in the course of its preparation via a precipitation method and the other oxide or the other's precursor in the course of its preparation via a precipitation method in water; separating, washing and drying a precipitate formed; and calcining the precipitate at a temperature of up to 600° C.

3. A process according to claim 2, wherein calcining is conducted at 250° to 500° C. for 3 hours or more in the presence of steam.

4. A process according to claim 1, wherein the reaction is conducted keeping a difference between the highest temperature of a reaction zone and a gas temperature at the outlet of the reactor within 0° to 120° C.

5. A process according to claim 1, wherein the concentration of steam at the inlet of the reactor is at least 50 vol %; the molar ratio of oxygen to ammonia is 0.3 to 3.0; the reaction pressure is 0 to 10 kg/cm2-G; and the reaction temperature is 250° to 450° C.

6. A process according to claim 1, wherein the product gas is separated by cooling into a non-condensable gas comprising nitrous oxide, nitrogen and oxygen, and water containing ammonia, and the water containing ammonia is recycled into the reactor.

7. A process according to claim 6, wherein nitrous oxide is separated as liquid from the non-condensable gas by heat exchange of the gas with liquid nitrogen.

8. A process according to claim 7, wherein liquid nitrogen at the inlet of the heat exchanger is in the state of mixed-phase comprising gas and liquid phases, and a proportion by weight of liquid and gas phases is 1:0.05 to 1:20.

9. A process according to claim 7, wherein the pressure applied for separation of nitrous oxide as liquid is 10 to 100 kg/cm2-G.

10. A process according to claim 6, wherein nitrous oxide is separated as liquid from the non-condensable gas by heat exchange of the gas with liquid oxygen, and the used oxygen is supplied into the reactor as a reactant.

11. A process according to claim 10, wherein liquid oxygen at the inlet of the heat exchanger is in the state of mixed-phase comprising gas and liquid phases, and a proportion by weight of liquid and gas phases is 1:0.05 to 1:20.

12. A process according to claim 10, wherein the pressure applied for separation of nitrous oxide as liquid is 10 to 100 kg/cm2-G.

* * * * *